Oct. 6, 1959  J. K. ERZER  2,907,282
RAIL VEHICLE SUSPENSION
Filed Sept. 4, 1957
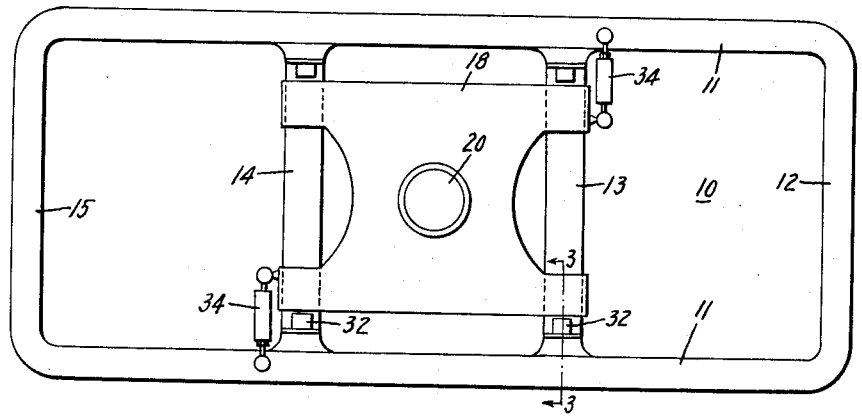
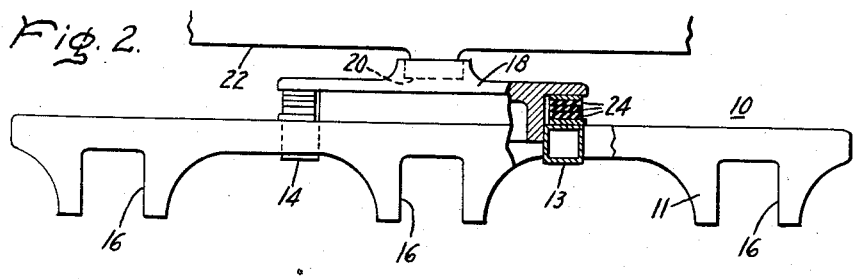
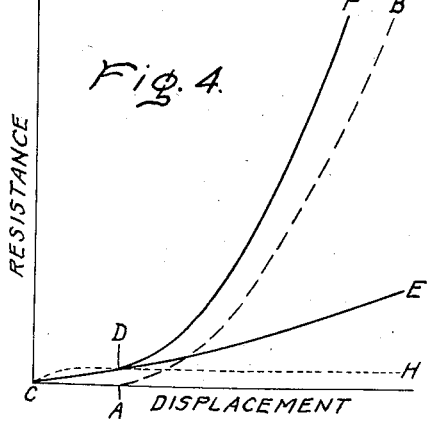
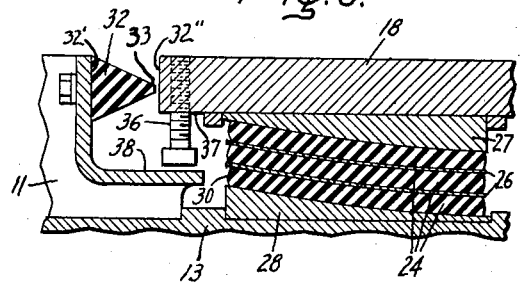
Inventor:
John K. Erzer,
by David P. Ogden
His Attorney.

United States Patent Office 2,907,282
Patented Oct. 6, 1959

2,907,282

RAIL VEHICLE SUSPENSION

John K. Erzer, Erie, Pa., assignor to General Electric Company, a corporation of New York Application September 4, 1957, Serial No. 682,061

5 Claims. (Cl. 105—185)

My invention relates to rail vehicle suspension and, more particularly, to a truck mounting adapted to have controlled lateral displacement.

In a construction of rail vehicles, it has been the conventional practice to support the body of the vehicle on a rotatable centerplate formed on a truck frame. This arrangement both supports the vehicle and permits the truck to pivot with respect to the vehicle, thereby facilitating negotiation of curves in the track. However, as the speeds of the trains are increased, the axles tend to oscillate laterally more violently between the tracks, both straight and curved. It is essential that a truck for a high speed locomotive be provided with a support which will absorb these oscillations without transmitting them to the body and particularly the cab. Without sufficient isolation, these oscillations immeasurably increase the fatigue of the engine crews, are likely to damage equipment and might even cause the locomotive to leave the rail.

Many attempts to accomplish a comfortable and smooth ride have not proven entirely satisfactory because, on the one hand, the isolation of the locomotive cab from the axle lateral oscillations requires very soft restoring means in the lateral direction for a short distance to eliminate high frequency, short duration vibrations. On the other hand, when the locomotive negotiates curves or noses first left and then right on a straight track, the lateral softness, if uncontrolled, would allow the cab to move continuously back and forth the maximum lateral travel between fixed stops. With the momentum of a locomotive cab, the movement, when reversed by the fixed stops, causes the ride to be both uncomfortable and dangerous. Moreover, at high speeds, the locomotive cab will tend to side sway uncontrollably if the vertical springs are too soft.

On means of solving this problem of side sway has been to use a swivel bolster hung on "swing hangers." With a swing hanger support, the locomotive body rests on a swivel bolster which is hung from the truck frame on large support links or pendulum members. The pendulum action of the support links of the swing hangers imparts a banking action to superelevate the body of the vehicle which will inhibit undesirable side sway on curves. However, this swing hanger support is expensive; first, because of the initial cost of the intricate arrangement of heavy steel parts, and second, because of the additional length required for a truck where the traction motors on each of the axles occupy all of the useful space between the axles. The addition of swing hangers increases the length of the trucks and, consequently, the length of the locomotive. These increases in length add useless weight and cost to the locomotive. Moreover, the minimum allowable turning radius is increased.

However, because of the riding characteristics of the swing hanger which cause the banking action of the locomotive cab on curves, the railroads have found this supporting system to be the most satisfactory despite these disadvantages.

Therefore, an object of my invention is to provide a reliable, simple, and inexpensive rail vehicle construction wherein the body of the locomotive is supported on a truck providing controlled lateral motion combined with a predetermined banking action during lateral motion.

In accordance with one modification of my invention, a rail vehicle body is supported on the truck by means of a swivel bolster resiliently mounted on the truck. Banking action is obtained by the use of curved rubber support pads between the bolster and the frame of the truck which cause the bolster to be banked as it swings outwardly on the truck. I have also provided auxiliary means for increasing the lateral restoring forces when the bolster has been displaced laterally a predetermined amount.

The subject matter which I regard as my invention is particularly pointed out and distinctly claimed in the concluding portion of this specification. My invention, however, both as to its organization and method of operation together with further objects and advantages thereof may best be understood by reference to the following description taken in connection with the accompanying drawing, in which:

Fig. 1 is a simplified top plan view of a truck embodying my invention;

Fig. 2 is a side view partially cut away of a truck shown in Fig. 1;

Fig. 3 is an enlarged detail view of my invention taken along the line 3—3 of Fig. 1; and Fig. 4 is a curve of the relation between the resistance to lateral displacement against the amount of lateral displacement.

Referring now to the drawing, in which like numerals identify similar part, I have shown a truck frame 10 provided with the longitudinal side members 11 and the lateral cross members 12, 13, 14 and 15. As shown in Fig. 2, the frame member 11 is provided with recesses 16 which accommodate journal boxes adapted to be supported on axles and wheels (not shown). The lateral cross members or transoms 13 and 14 are secured to the longitudinal frame member 11 in a manner which will allow the support of a locomotive thereon by means of a bolster 18 having a swivel center plate 20.

The parts 10 through 20 cooperate to provide support for the locomotive body 22 by the swivel center plate 20 which is a portion of the bolster 18, and is itself supported on the transverse transoms 13 and 14. The weight of the locomotive is transferred from transoms 13 and 14 to the longitudinal frame members 11 and from there to the journal boxes, axles, and to the wheels on the rail. The use of a bolster to support a body on a three axle truck is well known. It provides sufficient clearance to motorize the center axle and provides satisfactory longitudinal stability.

A usual means of supporting the truck 10 on three axles is to use equalizers which are well known in the art. However, the details of this portion of the structure are not related to my invention. A suitable arrangement for these parts, including equalizers, is shown in more detail and described in Letters Patent 2,583,765 issued to B. S. Cain on January 29, 1952, and assigned to the assignee of this application.

According to my invention, the sole support of the bolster 18 on the transoms 13 and 14 is by the use of a rubber pad 24 placed under and compressed by each corner of the bolster. Although the use of a rubber pad of this type has been known for many years, such use has not been widely adopted because of the rail industry's preference for banking action of the locomotive cab when negotiating curves. Moreover, there have been many other problems which required solution before accepting rubber to support the mass of the locomotive. The design of the rubber pad itself now is superior to that available on the market prior to World War II. Moreover, the rubber now may be bonded securely in thin layers to the metal plates 26 to produce several alternate layers of rubber, which may be deflected individually with the rubber in shear. The use of a single pad which is vertically as thick as the several layers shown would make it very difficult to obtain the desired restoring forces for large lateral movements.

In accordance with my invention I have provided means for producing a banking action as well as a minimum of lateral restoring force for short lateral displacements of the locomotive body relative to the truck 10. As shown in Fig. 3 each of the pads 24 and each of the metal plates 26 is formed with a slight lateral curvature. Also a top support plate 27 and a bottom support plate 28 are each provided with a similar curvature. I prefer to have the members 24, 26, 27 and 28 all bonded together to form an integral pad arrangement having the rubber portion curved and compressed between the adjacent surfaces of the plates 27 and 28 as shown. Initial lateral displacement causes shear loading of the rubber. Moreover, when the body of the vehicle moves laterally as during the negotiation of curves, the vertical compression loading of the rubber pads is shifted toward the pad closest to the apparent center of gravity. Such increased loading during negotation of curved track is usually on the pad on the outside of the curve. A portion of the lateral force is absorbed by the raised outer end 30 of the pad 24 and sideways compression of this raised outer end of the rubber increases proportional to the displacement. Thus, the displacements of an inch or more will be counterbalanced by lateral shear and compressional restoring forces and a lifting or banking force. This curved pad 24 is a major step toward providing an optimum riding characteristic.

I have found that the slope of the rubber support pads 24 is critical if I am to obtain a desirable banking action instead of an undesirable sidesway. The effective slope of the support pads must be such that the support vectors drawn perpendicular to the average effective slope of the pads through their centers of pressure intersect above the center of mass of the locomotive body 22. Thus, the lower portion of the body 22 will swing outward on curves and return because the momentary center of rotation is always above the center of mass. I have found that, in one locomotive, an average slope of from five to fifteen degrees will provide stability with a comfortable banking action. Obviously the height of the center of mass of the locomotive body 22 and width of the truck must be considered in determining the desirable effective slope of the rubber support pads 24 and the resulting momentary center of rotation.

Also, I have found that the addition of a laterally thick resilient bolster stop 32 between a rigid longitudinal vertical surface 32' of the frame member 11 and a parallel surface 32" of the bolster 18 will materially improve the ride on a very rough track or on curves at high speeds.

In the past, bolster swing motion has been stopped by a thin, flat plate of rubber or steel between the bolster and the metallic side frame of the truck. It can be well imagined that this stopping of a mass of the magnitude of the locomotive body causes severe strains within the truck and within the cab. The resulting jolt is very uncomfortable. Therefore, I have provided the thick rubber stop 32 at each corner of the bolster 18 which will reduce the jolt and the strain. Moreover, in order to provide a restoring force proportional to the lateral displacement, I have tapered the stops 32 to create a minimum compression in a relatively thin cross section with the increasing cross section providing a restoring force that rapidly increases to a greater value as an increasing amount of rubber is put into compression. I prefer to have the leading edge 33 of the thick tapered rubber stops 32 approximately one-quarter inch from the bolster 18 when the bolster is centered on the truck 10. In order to prevent destruction of the resilient stops 32, I have designed them to be thicker laterally than I contemplate the bolster will move. Thus the stops 32 will never be completely crushed but will provide sufficient restoring forces to stop lateral movement.

The lateral displacement restoring forces are illustrated in the curve shown in Fig. 4 wherein the resistance to lateral displacement is plotted on the axis of ordinates and the displacement is plotted on the axis of abscissas. The dashed line AB represents the restoring force provided by the rubber stops 32. It is easily seen that the restoring force of the rubber stops 32 increases rapidly once the bolster 18 is displaced laterally sufficiently to engage it.

The solid line CDE represents the restoring force of the curved rubbed pads 24, and the line CDF represents the restoring force of the pads 24 added to the force provided by the rubber stops 32. Since most small oscillations do not move the bolster 18 sufficiently to engage the rubber stops 32, the restoring force, as shown on the curve at CD, is a very soft restoring force, similar to that of a swing hanger.

In order to utilize these soft lateral restoring forces, means must be provided to damp the lateral oscillations. Therefore, I have connected the bolster 18 to each of the side frame members 11 by the snubbers 34. The snubbers 34 are internal friction or hydraulic devices which are arranged symmetrically with relation to the vertical center line of the bolster 18 to absorb energy. Each snubber 34 resists compression or tension. One type of snubber has an outer cylinder pivotably secured to the frame member 11 and an internal piston pivotably secured to the bolster 18. Relative movement of the piston to the frame causes friction shoes to slide within the cylinder to dissipate the vibration energy in the form of friction heat. The amount of damping required depends on the mass of the locomotive, the roughness of the track and the operating velocities contemplated.

Also in Fig. 4, I have shown a dotted line CH of a typical snubbing force. Usually, because of the looseness of the snubber mounts and the arrangement of the parts within the cylinder, little snubbing occurs until the bolster has moved a fraction of an inch. Also, the snubbing may be designed to increase gradually to a maximum which is maintained for any further outward lateral motion.

According to my invention, not only does the bolster mounting provide laterally soft restoring forces for small oscillations but also the curvature and slope of the rubber pads 24 causes a banking action of the bolster 18 relative to the truck 10. Thus, my invention incorporates the basic advantages of the expensive swing hanger support with a simple and inexpensive bolster arrangement. Moreover, banking action tends to keep the apparent center of gravity relatively fixed while the cab moves sideways when the locomotive is negotating curves. This is obviously an advantage when the crew members are moving about within a speeding locomotive. Since with the desired pendulum banking action the central portion of the locomotive does not move as much as the lower portion, a comfortable ride is provided.

Moreover, the banking action is an advantage in creating an added restoring force which will tend to keep the cab centered over the trucks. This added restoring force is most effective on larger lateral displacements where the center of gravity is raised the most and where the restoring force is most needed. With this added force, the rubber pads 24 may be very soft for smaller lateral oscillations. Also, this superelevation, when used as one of the primary restoring forces, is the least likely to cause strain within the truck or cab structure because it is not concentrated at one end of the cab.

It is readily apparent that banking action will compress the rubber pads 24 over which the body 22 has moved. However, the compression (and restoring force) is in all of the rubber pads 24 along one side of the body 22 and not concentrated in just the two pads 24 of one truck. Under certain operating conditions, this restoring force is distinguishable from the operation of the rubber stops 32. For instance, when the body tends "to nose" on a straight track, its front ends tends to go first to the left and then the right, to engage the rubber stops 32 on the front truck. At the same time its rear end tends to go first to the right and then to the left to engage the opposite lateral stops 32 on the rear truck. Also, when the locomotive starts around a curve, the lead truck will tend to be laterally displaced before banking action is effective. In each of these cases, the trailing trucks may not be displaced sufficiently relative to the cab to provide cooperating effective restoring forces. Thus, the banking action tends to prevent nosing by providing an instantaneous force in the form of an incompatible compression of the left and right rubber pads of the leading and trailing trucks respectively. However, when the cab is displaced in the same direction relative to all of the trucks, as when negotiating curves, superelevation (or, conversely, compression in the rubber pads 24) of one side of the locomotive will provide a distributed restoring force.

Another feature of my truck arrangement is to provide added safety under severe operating conditions. For instance, in the event of derailment, forces transmitted to the pads 24 may damage them. Therefore, I have provided a safety stop shown as an adjustably secured bolt 36 (Fig. 3) between a rigid downwardly facing surface 37 at each corner of the bolster 18 and a rigid platform surface 38 on the side frames 11. Thus, if vertical displacement is great enough to engage the bolt 36, the added support of the bolt will stop further motion quickly to prevent collapse of any corner of the bolster 18. Also, if the adjacent pad 24 should be destroyed or weakened sufficiently to cause the bolt 36 to engage the platform 38, further depression will be prevented and the locomotive may be operated until the pad 24 may be replaced. It should be noted that the bolt 36 is adjustable in height allowing control of the maximum amount of depression.

While I have shown and described particular embodiments of my invention, further modifications and improvements will occur to those skilled in the art. I desire it to be understood, therefore, that this invention is not limited to the form shown, and I intend in the appended claims to cover all modifications which do not depart from the true spirit and scope of my invention.

What I claim as new and desire to secure by Letters Patent of the United States is:

1. A railway truck adapted to support a rail vehicle and provide controlled lateral motion along with a banking action comprising, a pair of longitudinal frame members, a pair of longitudinally spaced transverse transoms supported on said frame members, a bolster adapted to be supported by said transoms, rubber pad arrangements secured between said transoms and said bolster to support said bolster thereon and control lateral vibrations therebetween, each of said arrangements having a curved rubber pad supportingly engaging a curved surface thereof, said surface being provided with inner and outer portions relative to the longitudinal center line of the truck, said outer portions being raised relative to said inner portions, said inner portions being substantially horizontal, and said outer portions sloping upward whereby small high frequency lateral vibrations distort said rubber pad adjacent to said inner portions primarily in shear and major lateral deflections distort said rubber pad within said arrangement both in shear and in lateral compression to provide a banking action of the vehicle on curves.

2. A railway truck adapted to support a rail vehicle and provide controlled lateral motion along with a banking action comprising, a pair of longitudinal frame members, a pair of longitudinally spaced transverse transoms supported on said frame members, a bolster adapted to span the distance between and be supported on said transoms, curved rubber pad arrangements secured between said transoms and said bolster to support said bolster thereon and control lateral vibrations therebetween, each rubber pad arrangement having inner and outer portions relative to the longitudinal center line of the truck, said outer portions being spaced to provide lateral stability and being raised relative to said inner portions, said inner portions being substantially horizontal, said outer portions sloping upward whereby small lateral vibrations distort said inner portions primarily in shear and major lateral deflections distort said pad both in shear and in lateral compression to provide the banking action of the vehicle on curves and lateral restoring forces that increase with lateral displacement, and an adjustable stop positioned at each corner of said bolster between a downwardly facing rigid surface of said bolster and an upwardly facing rigid surface of said side frames to limit depression of each corner of said bolster to a predetermined amount and thus provide protection for said curved rubber pad arrangement at any time a vertical force tends to exceed said amount.

3. A railway truck adapted to support a rail vehicle and provide controlled lateral motion along with a banking action comprising, a pair of longitudinal frame members, a pair of longitudinal spaced transverse transoms supported on said frame members, a bolster adapted to span the distance between and be supported by said transoms, a curved rubber support pad arrangement secured between said transoms and each corner of said bolster to support said bolster thereon and control lateral vibrations therebetween, each rubber pad within said arrangement having inner and outer portions relative to the longitudinal center line of the truck, said outer portions being spaced to provide lateral stability and being raised relative to said inner portions, the amount by which said outer portions are raised relative to said inner portions being selected so that support vectors of said pads will intersect at a point above the center of mass of the vehicle to provide the banking action on curves and lateral restoring forces that increase with lateral displacement.

4. A railway truck adapted to support a rail vehicle and provide controlled lateral motion along with a banking action comprising, a truck frame, a bolster adapted to be supported by said frame, a curved rubber support pad arrangement rigidly secured between said frame and each corner of said bolster, each rubber pad within said arrangement having inner and outer portions relative to the longitudinal center line of the truck, said outer portions being spaced to provide lateral stability and being raised relative to said inner portions, the amount by which said outer portions are raised relative to said inner portions being selected so that support vectors of said pads will intersect at a point above the center of mass of the vehicle to provide the banking action on curves and lateral restoring forces that increase with lateral displacement.

5. In combination with a railway truck adapted to support a rail vehicle and provide controlled lateral motion along with a banking action wherein the truck is provided with a pair of longitudinal frame members, a pair of longitudinally spaced transverse transoms supported on the frame members and a bolster adapted to be supported by the transoms, rubber pad arrangements secured between the transoms and the bolster to support the bolster thereon and influence the lateral vibrations therebetween, each arrangement comprising a top support plate having a convex lower curved surface, a bottom support plate having a concave upper curved surface, an integral rubber pad compressed by the vertical forces between said surfaces and being provided with inner and outer portions relative to the longitudinal center line of the truck, said outer portions and the mating surfaces of said plates being raised relative to said inner portions, said inner portions of said pad being substantially horizontal between mating portions of said surfaces, and said outer portions sloping upwardly whereby small lateral vibrations distort said inner portions primarily in shear and large lateral deflections distort said pad both in shear and in lateral compression thus providing a banking action of the vehicle on curves.

References Cited in the file of this patent

UNITED STATES PATENTS

| | | |
|---|---|---|
| Re. 24,349 | Travilla | Aug. 27, 1957 |
| 2,237,757 | Eksergian et al. | Apr. 8, 1941 |
| 2,313,740 | Eksergian et al. | Mar. 16, 1943 |
| 2,638,058 | Williams | May 12, 1953 |
| 2,645,188 | Williams | July 14, 1953 |
| 2,652,001 | Travilla et al. | Sept. 15, 1953 |

FOREIGN PATENTS

| | | |
|---|---|---|
| 687,221 | Great Britain | Feb. 11, 1953 |